US006057528A

United States Patent [19]
Cook

[11] Patent Number: 6,057,528
[45] Date of Patent: May 2, 2000

[54] COMPACT HIGH SPEED OVEN

[75] Inventor: Edward R. Cook, Cedar Rapids, Iowa

[73] Assignee: Amana Company, L.P., Amana, Iowa

[21] Appl. No.: 09/088,748

[22] Filed: Jun. 2, 1998

[51] Int. Cl.[7] .......... A21B 1/00

[52] U.S. Cl. .......... 219/405; 219/400; 219/391; 219/685; 392/416; 99/352

[58] Field of Search .......... 219/685, 400, 219/405, 391, 404, 738, 349; 126/21; 392/416; 99/352, 357, 386, 443

[56] References Cited

U.S. PATENT DOCUMENTS

| | | | |
|---|---|---|---|
| 4,486,639 | 12/1984 | Mittelsteadt | 219/685 |
| 5,033,366 | 7/1991 | Sullivan | 99/352 |
| 5,066,851 | 11/1991 | Darvin | 219/400 |

*Primary Examiner*—Teresa Walberg
*Assistant Examiner*—Leonid Fastovsky
*Attorney, Agent, or Firm*—Tobor, Goldstein & Healey, L.L.P.

[57] ABSTRACT

A compact oven assembly has a housing and a high power density, low mass heating element. The housing defines a cooking cavity and a slot which permits access to the cooking cavity. The high power density, low mass heating element is supported by the housing above the cooking cavity. The compact oven assembly may include a food support which is arranged so that, when the food support is inserted into the cooking cavity through the slot, the slot of the housing is substantially closed off. The compact oven may also include a switch operated by the food support when the food support is inserted into the cooking cavity through the slot in order to energize the high power density, low mass heating element. Each high power density heating element has a formed parabolic reflector located above it and opposite to the cooking plane. Accordingly, the energy from the high power density heating elements is directed toward the cooking plane. The location of food and the position of the high power density heating elements within their corresponding reflectors are important to assure both optimum power density and uniformity of energy distribution over the cooking plane.

37 Claims, 3 Drawing Sheets

FIG. 5
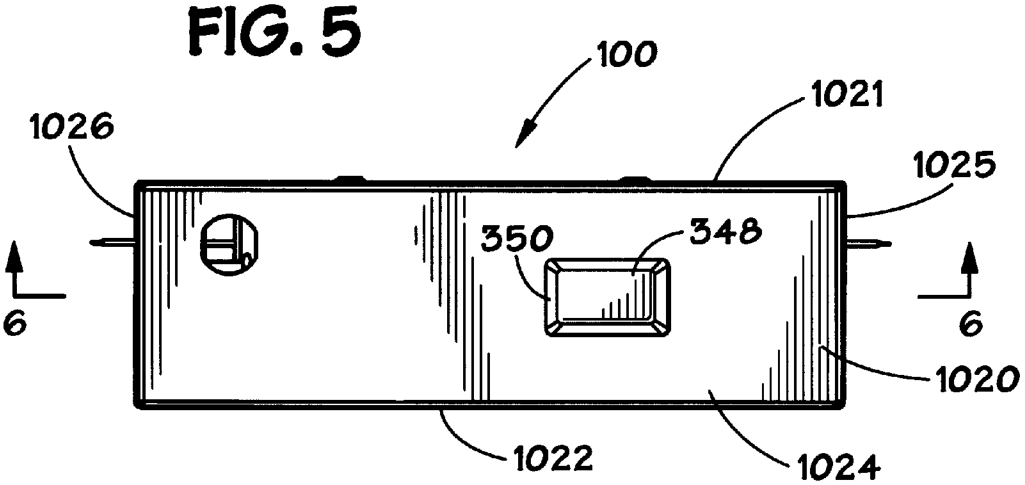
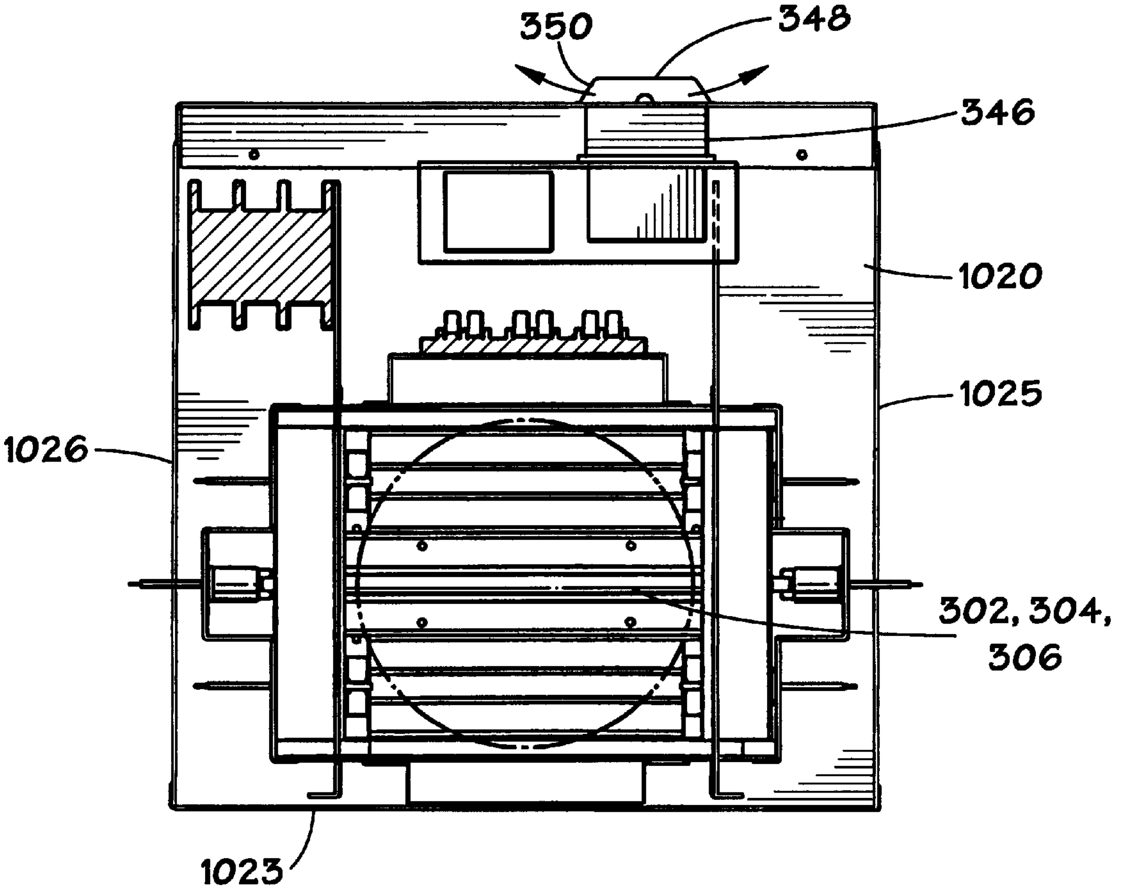
FIG. 6

COMPACT HIGH SPEED OVEN

TECHNICAL FIELD OF THE INVENTION

The present invention relates to a compact, high speed oven and, more particularly, to a compact, high speed oven that uses high power density, low mass instant-on heating elements.

BACKGROUND OF THE INVENTION

Ovens, such as commercial ovens used in restaurants or other establishments, are frequently employed to rapidly heat and brown certain foods. One of the more common examples of a food needing heating and browning is cheese.

Several different types of ovens have been used in the past to heat and brown food. For example, in order to meet peak demand requirements, a large deck oven is often employed because it can process a large quantity of food product at the same time. This type of oven usually implements convection cooking. Convection cooking, however, requires extended cooking times in order to brown and melt food products. Additionally, the space requirement for a typical deck oven is often prohibitive in many commercial kitchens, especially smaller satellite restaurants and kiosks where there is typically insufficient floor space to devote to large deck ovens.

Therefore, where space is at a premium, small infrared (IR) ovens are used. These IR ovens often require approximately 20 to 30 seconds to brown and heat certain foods (e.g., cheese). However, during peak and high volume demand periods, such cooking times are often unacceptable, particularly where a smaller oven processes less food at a time.

Another significant problem with deck ovens and IR ovens is that either they require preheating because of their high mass heating elements or they must be energized throughout the day in order to avoid the wasted time of preheating. If they are energized throughout the day, an additional load on environmental systems, such as air conditioners, is created.

In order to achieve faster melting times and at the same time avoid extended on-times, either microwave ovens or ovens using quartz resistive heating elements may be used. However, microwave ovens typically do not achieve the required browning, and ovens utilizing quartz resistive heating elements do not reach optimum power density for high speed melting/browning. Moreover, ovens using quartz halogen lamps are known, but such ovens are too large and costly to gain market acceptance.

The present invention is arranged to overcome one or more of the above-stated problems.

SUMMARY OF THE INVENTION

According to one aspect of the present invention, a compact oven comprises a housing, a high power density and low mass heating element, and a switch. The housing defines a cooking cavity and a slot permitting access to the cooking cavity. The high power density and low mass heating element is supported in the cooking cavity. The switch is operated by food being inserted into the cooking cavity through the slot in order to energize the high power density and low mass heating element.

According to another aspect of the present invention, a compact oven assembly comprises a housing, a high power density and low mass heating element, and a food support. The housing defines a cooking cavity and a slot permitting access to the cooking cavity. The high power density and low mass heating element is supported by the housing above the cooking cavity. The food support is arranged so that, when the food support is inserted into the cooking cavity through the slot, the slot of the housing is substantially closed off by the food support.

According to yet another aspect of the present invention, a compact oven assembly comprises a housing, a heating element, a switch, and a food support. The housing defines a cooking cavity and a slot permitting access to the cooking cavity. The heating element is supported within the housing. The switch is supported within the housing and is arranged to control the heating element when operated. The food support is arranged so that, when the food support is inserted into the cooking cavity through the slot, the switch is operated by the food support.

BRIEF DESCRIPTION OF THE DRAWINGS

These and other features and advantages of the present invention will become more apparent from a detailed consideration of the invention when taken in conjunction with the drawings in which:

FIG. 5 is an elevation view of the oven assembly of FIG. 1;

FIG. 6 is a top view of a portion of the oven assembly of FIG. 1; and,

DETAILED DESCRIPTION

Figure 2:
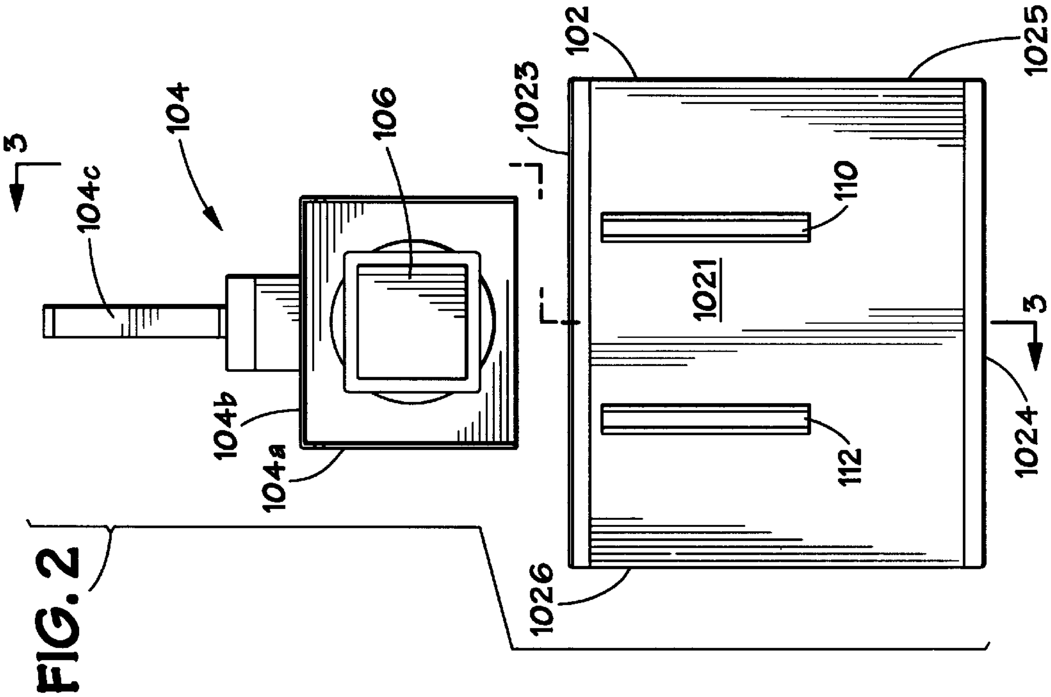
FIG. 2 is an exploded plan view of the oven assembly of FIG. 1.
Figure 1:
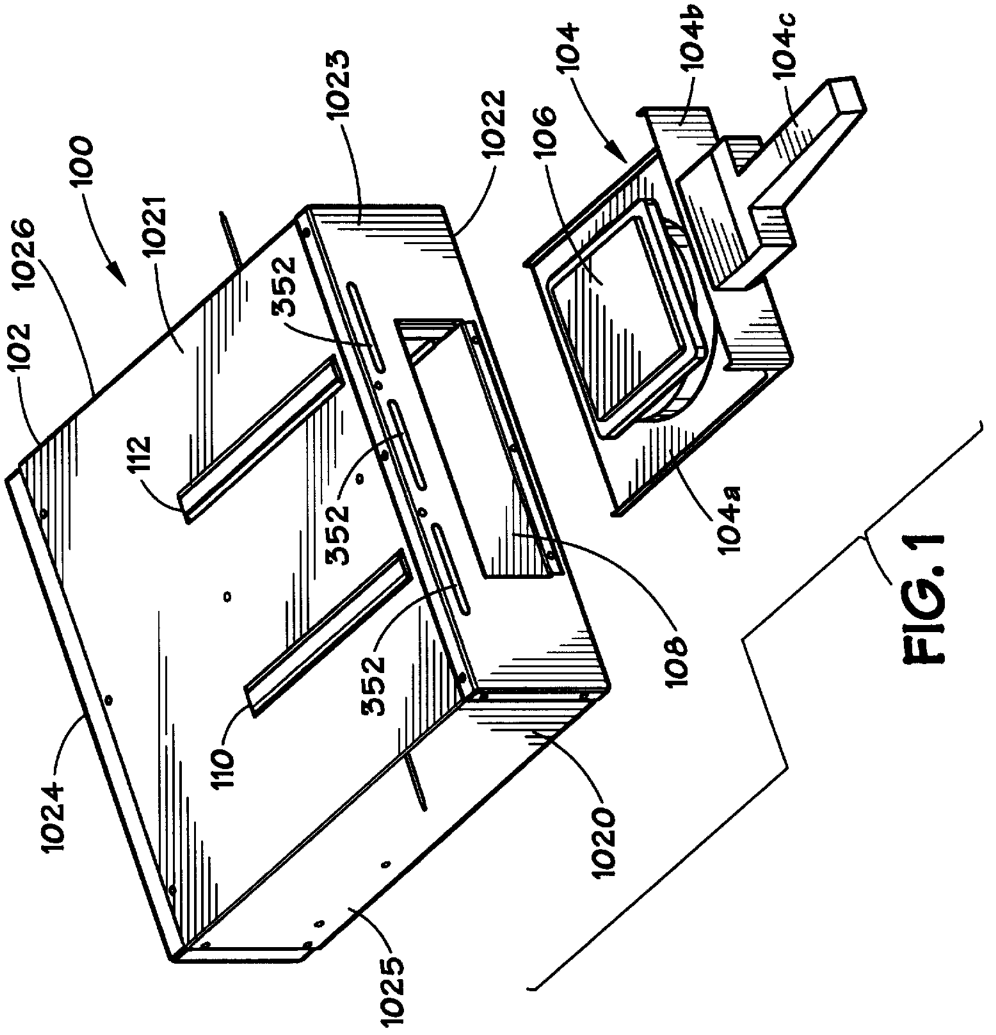
FIG. 1 is an exploded perspective view of a single slot oven assembly of the present invention.

In the drawings, like numerals refer to like matter throughout. As shown in FIGS. 1 and 2, an oven assembly 100 includes an oven 102 and a spatula 104 shown with a food item 106 supported thereon. The spatula 104 has a horizontal surface 104*a*, a vertical surface 104*b* joined to the horizontal surface 104*a*, and a handle 104*c* joined to the vertical surface 104*b*. The spatula 104 may be arranged so that its vertical surface 104*b* substantially closes off an access slot 108 of the oven 102 when the spatula 104 is fully inserted through the access slot 108 into the oven 102. The food item 106 is supported on the horizontal surface 104*a*.

The oven 102 has a housing 1020 with a top side 1021, a bottom side 1022, a front side 1023, a back side 1024, a left side 1025, and a right side 1026. The top side 1021 of the housing 1020 is provided with a first bracket 110 and a second bracket 112 that are arranged to support the oven 102 from beneath a cabinet, if desired.

Figure 3:
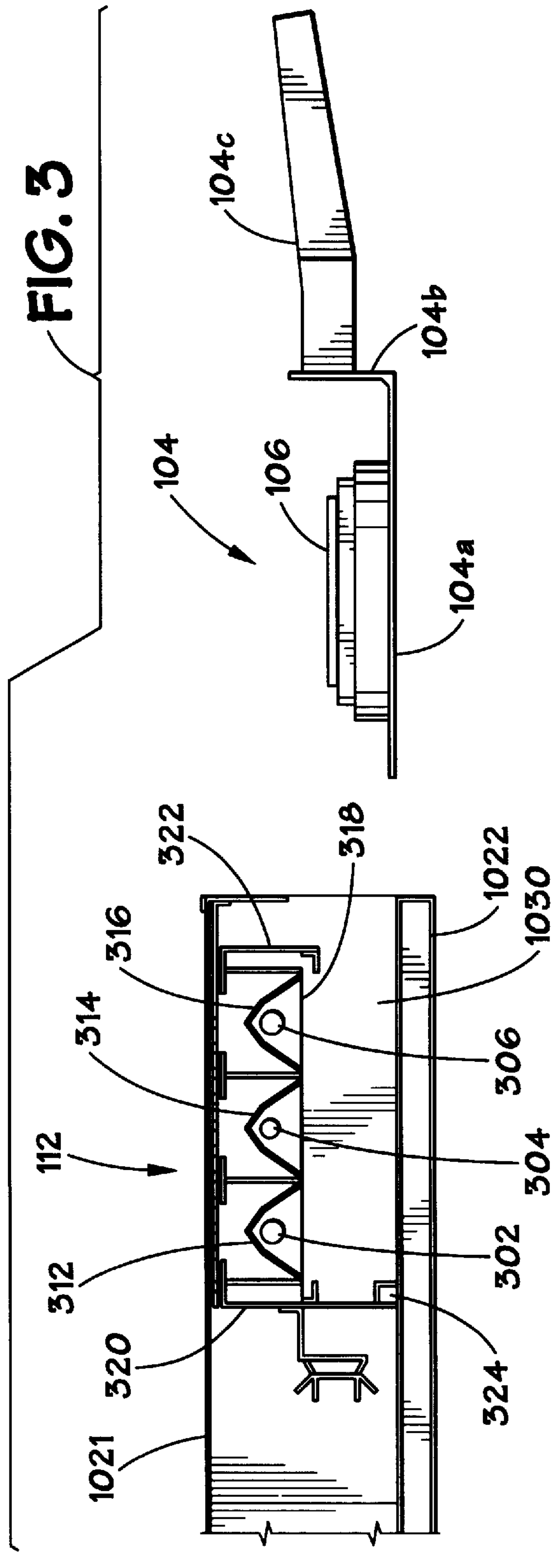
FIG. 3 is a cross-sectional view of the oven assembly of the present invention taken along line 3—3 of FIG. 2.

As shown in FIG. 3, the oven 102 includes a plurality of heating elements 302, 304, and 306. The heating elements 302, 304, and 306 are preferably high power density, low mass heating elements. For example, the heating elements 302, 304, and 306 may be quartz infrared halogen lamps. A plurality of highly reflective parabolic reflectors 312, 314 and 316 cooperate with the heating elements 302, 304, and 306 to uniformly distribute the energy produced by the heating elements 302, 304, and 306 over the food item 106 when the food item 106 is within a cooking cavity 1030 of the oven 102. The highly reflective parabolic reflectors 312, 314 and 316, for example, may be formed of chromic acid anodized aluminum. For example, the distance from the center of the heating elements 302, 304, and 306 to the peak of the highly reflective parabolic reflectors 312, 314 and 316 may be about 0.422 inches, and the distance from the bottom of the heating elements 302, 304, and 306 to the surface of the food 106 may be about 0.901 inches. With this arrangement, about 100 w/in$^2$ of cooking power is available over a 5 inch diameter cooking plane.

Figure 7:
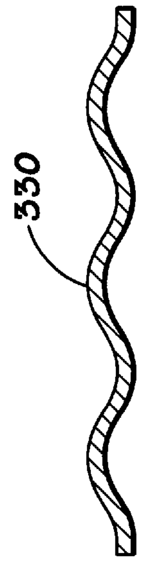
FIG. 7 is an alternative reflector which may be used in conjunction with the present invention.

Alternatively, a reflector 330, which may be made of a material such as aluminum, and which is shown in cross section in FIG. 7, may be used in place of the highly reflective parabolic reflectors 312, 314 and 316. The surface of the reflector 330 may be randomly embossed in order to scatter the heating energy from the heating elements 302, 304, and 306, although some power density may be sacrificed.

A removable shield 318 is disposed between the heating elements 302, 304, and 306 and the cooking cavity 1030. The removable shield 318 is transparent to the energy emitted by the heating elements 302, 304, and 306 and is preferably made of tempered Borosilicate or fused ceramic. The removable shield 318 is supported by brackets 320 and 322 so that the removable shield 318 shields the heating elements 302, 304, and 306 and the highly reflective parabolic reflectors 312, 314 and 316 from debris, such as debris produced during cooking.

The spatula 104 is designed for insertion through the access slot 108 of the oven 102 so the horizontal surface 104*a* supports the food item 106 a predetermined distance from the heating elements 302, 304, and 306. This predetermined distance may be, for example, approximately one inch.

The housing 1020 has a size that is compact. For example, the housing 1020 may be about 14" by 14" by 4¾" and the heating elements 302, 304, and 306 may be arranged to provide a cooking plane of about 28 square inches within the cooking cavity 1030.

Also shown in FIG. 3 is a limit switch 324 which is activated by the spatula 104 upon insertion of the spatula 104 into the cooking cavity 1030. The limit switch 324 is a matter of design choice and could be either a single throw mechanical switch having one or more poles depending upon the power supply, or any electrical, optical, or other switch capable of performing the desired functions. The limit switch 324 is arranged to be operated by the spatula 104 when it is fully inserted into the cooking cavity 1030 through the access slot 108.

Figure 4:
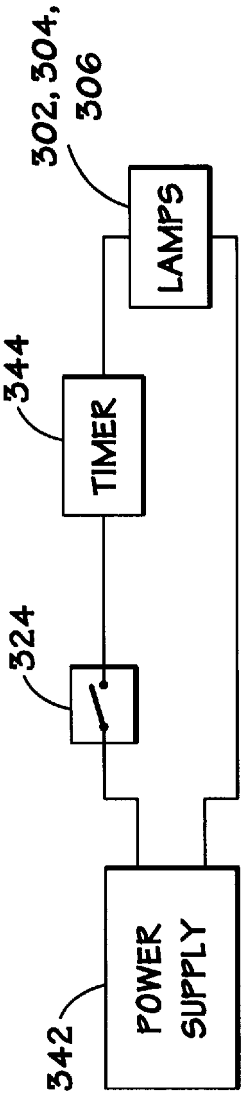
FIG. 4 is a block diagram of a circuit which controls operation of the oven assembly of the present invention.

As shown in FIG. 4, when the limit switch 324 is operated upon full insertion of the spatula 104 into the cooking cavity 1030, the limit switch 324 closes a circuit 340 between a power supply 342 and the heating elements 302, 304, and 306, which causes the heating elements 302, 304, and 306 to emit energy over the food item 106. Also, a timer 344, either digital or analog, is in the circuit in order to interrupt energization of the heating elements 302, 304, and 306 after the passage of a predetermined amount of time. For example, the timer 344 may include a switch which is normally closed but which opens after current passes through the timer 344 for the predetermined amount of time. Such a switch may be a bimetallic or other switch that latches open after current has passed through it for the predetermined amount of time and which requires manual reset. Alternatively, the timer 344 may be arranged to be automatically reset upon withdrawal of the spatula 104 from the slot 106 of the oven 102. As a further alternative, the timer 344 may be manually set for a range of operational times by way of a front panel input such as a knob or buttons. The predetermined amount of time may be in the range of 3–5 seconds, for example. The timer 344, for example, may be a solid state delay which delays turning off the heating elements 302, 304, and 306 until after the passage of a predetermined amount of time as determined by a potentiometer.

As shown in FIG. 6, a fan 346 is located in the rear of the oven 102 and is arranged to cool the heating elements 302, 304, and 306, the highly reflective parabolic reflectors 312, 314 and 316, and the circuit 340 in addition to maintaining acceptable exterior temperatures of the housing 1020. An air exhaust 350 (FIG. 6) and air inlets 352 (FIG. 1) are provided in the housing 1020 permitting the fan 346 to draw cooling air through the air inlets 352 into the housing 1020 and to expel heated air out of the housing 1020 through the air exhaust 350. The fan 346 may be a miniature centrifugal blower which is accommodated by a bump-out 348. Such a blower can move about 19 cfm of air at 3300 rpm.

In operation, a food item 106, (e.g., a hamburger bun and a beef patty with a slice of cheese) is placed on the spatula 104. The spatula 104 with the food item 106 thereon is inserted through the access slot 108 into the oven 102. The limit switch 324 senses the presence of the spatula 104 and automatically energizes the heating elements 302, 304, and 306. After the predetermined amount of time, the timer 344 deenergizes the heating elements 302, 304, and 306, and the spatula 104 with the food item 106 is removed from the oven 102.

Certain modifications of the present invention have been discussed above. Other modifications will occur to those practicing in the art of the present invention. For example, the oven 102 is shown with three heating elements 302, 304, and 306 and three highly reflective parabolic reflectors 312, 314 and 316. However, the oven 102 may include any suitable number of heating elements and any suitable number of highly reflective parabolic reflectors in order to optimize the absorbing plane area and apply maximum power density to the food surface.

Also, while tempered Borosilicate or fused ceramic may be preferred for the removable shield 318, it should be understood that other materials could be substituted for glass. In other cases, the removable shield 318 and the brackets 320 and 322 could be eliminated.

Additionally, the heating element 304, for example, may be a QIR208-1000TE quartz infrared halogen lamp rated at 1000 watts and 208 volts, and the heating elements 302 and 306, for example, may be QIR208-750TE quartz infrared halogen lamps rated at 750 watts and 208 volts. All such lamps may be supplied by USHIO. If quartz infrared halogen lamps are used for the heating elements 302, 304, and 306, such lamps may be operated, for example, with a color temperature of about 2900K and having a peak energy output at about 1000 nm. However, other quartz infrared halogen lamps having the same or different power and voltage ratings and operational characteristics may be used for the heating elements 302, 304, and 306. Indeed, heating elements other than high power density, low mass lamps and other than quartz infrared halogen lamps may be used. The selection of specific lamps having a peak energy output within a certain wavelength range may be determined by matching the absorption characteristics of the food to the energy emittance of the lamps.

Moreover, the highly reflective parabolic reflectors 312, 314 and 316 are described, by way of example, as being formed of chromic acid anodized aluminum. Instead, the highly reflective parabolic reflectors 312, 314 and 316 may be formed of other materials depending, for example, on the type of lamp, the wavelength peak of the lamp, and the reflectance characteristic of the lamp.

Furthermore, the timer 344 may be eliminated so that the predetermined amount of time is determined manually, in which case the limit switch 324 senses the withdrawal of the spatula 104 at the end of the manually time interval in order to automatically de-energize the heating elements 302, 304, and 306. Additionally, or alternatively, the timer 344 may be arranged to energize an end-of-cooking-time alerting device with or without deenergization of the heating elements 302, 304, and 306 by the timer 344.

Also, the circuit 340 may include more sophisticated electronics that provide such features as adjustment of power levels, variations in lamp energy as a function of operating time, or the like. Such features may require additional user interface equipment such as switches, dials, programming key pads, and other well known control devices. The decision of what types of control devices to use is a matter of design choice and should reflect the needs for a particular application.

Additionally, a single slot oven is described above. However, it is understood that an oven may be constructed with numerous slots and with slots of varying sizes and shapes.

Moreover, the limit switch 324 within the oven 102 may be replaced by, or supplemented with, a manually operated switch on the outside of the housing 1020 such that the manually operated switch may be manually operated by a person in order to initiate and/or terminate cooking. The limit switch 324 may be an optical limit switch or a contact type limit switch.

Furthermore, the spatula 104 is provided in order to support the food item 106 during cooking. Instead, other forms of food supports, such as griddles, grills pans, sheets, dishes, or the like, may be provided to support the food item 106 during cooking.

Also, as shown in the drawing, the limit switch 324 is placed within the oven 102 so that the limit switch 324 is operated by the horizontal surface 104*a*. Alternatively, the limit switch 324 may be placed within the oven 102 so that the limit switch 324 is operated by the vertical surface 104*b* or any other suitable part of the spatula 104.

Moreover, as shown in the drawings, the oven 102 has heating elements only above the food item 106. Alternatively, the oven 102 may have additional heating elements to provide heating from below the food item 106.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A compact oven comprising:

a housing defining a cooking cavity, a slot permitting access to the cooking cavity;

at least one high power density, low mass heating element supported in the cooking cavity;

a switch responsive to food being inserted into the cooking cavity through the slot in order to energize the at least one high power density, low mass heating element; and a timer arranged to deenergize the high power density, low mass heating element within a predetermined amount of time following energization of the high power density, low mass heating element by the switch.

2. The compact oven of claim 1 further comprising a shield between the high power density, low mass heating element and the cooking cavity.

3. The compact oven of claim 1 wherein the switch is arranged to deenergize the high power density, low mass heating element when the food is withdrawn from the cooking cavity through the slot.

4. The compact oven of claim 1 wherein the high power density, low mass heating element is a quartz infared halogen lamp.

5. The compact oven of claim 1 further comprising a fan arranged to cool the high power density, low mass heating element.

6. The compact oven of claim 1 further comprising a reflector cooperating with the high power density, low mass heating element to uniformly distribute energy provided by the high power density, low mass heating element over the food.

7. The compact oven of claim 6 further comprising a fan arranged to cool the high power density, low mass heating element and the reflector.

8. The compact oven of claim 6 further comprising a shield between the high power density, low mass heating element and the cooking cavity.

9. The compact oven of claim 8 further comprising a fan arranged to cool the high power density, low mass heating element, the rejector, and the shield.

10. A compact oven assembly comprising:

a housing defining a cooking cavity, a slot permitting access to the cooking cavity;

at least one high power density, low mass heating element supported above the cooking cavity;

a food support received within the cooking cavity and insertable through the slot, the slot of the housing being substantially closed off by a surface of the food support; and a switch responsive to the food support being inserted into the cooking cavity through the slot to energize the high power density, low mass heating element.

11. The compact oven of claim 10 wherein the switch is arranged to deenergize the high power density, low mass heating element when the food is withdrawn from the cooking cavity through the slot.

12. The compact oven of claim 10 further comprising a timer arranged to deenergize the high power density, low mass heating element within a predetermined amount of time following energization of the high power density, low mass heating element by the switch.

13. The compact oven of claim 10 further comprising a shield between the high power density, low mass heating element and the cooking cavity.

14. The compact oven of claim 10 wherein the high power density, low mass heating element is a quartz infared halogen lamp.

15. The compact oven of claim 10 further comprising a fan arranged cool the high power density, low mass heating element.

16. The compact oven of claim 10 further comprising a reflector cooperating with the high power density, low mass heating element to uniformly distribute energy provided by the high power density, low mass heating element over the food.

17. The compact oven of claim 10 further comprising a fan arranged cool the high power density, low mass heating element and the rejector.

18. The compact oven of claim 16 further comprising a shield between the high power density, low mass heating element and the cooking cavity.

19. The compact oven of claim 18 further comprising a fan arranged cool the high power density, low mass heating element, the relector, and the shield.

20. The compact oven of claim 16 further comprising a timer arranged to deenergize the high power density, low mass heating element within a predetermined amount of time following energization of the high power density, low mass heating element.

21. The compact oven of claim 16 further comprising a timer arranged to deenergize the high power density, low mass heating element within a predetermined amount of time following energization of the high power density, low mass heating element by the switch.

22. The compact oven of claim 1, wherein the oven includes an additional heating element disposed below the food item, to provide heating from below the food item.

23. The compact oven of claim 10, wherein the oven includes an additional heating element disposed below the food item, to provide heating from below the food item.

24. The compact oven of claim 1, wherein the oven provides a power density up to 100 watts per square inch to a cooking plane.

25. The compact oven of claim 10, wherein the oven provides a power density up to 100 watts per square inch to a cooking plane.

26. The compact oven of claim 6, wherein the at least one reflector is parabolic in shape and constructed of a highly reflective material.

27. The compact oven of claim 16, wherein the at least one parabolic reflector is constructed of a highly reflective material.

28. The compact oven of claim 26, wherein the at least one highly reflective parabolic reflector is constructed of chromic acid anodized aluminum.

29. The compact oven of claim 27, wherein the at least one highly reflective parabolic reflector is constructed of chromic acid anodized aluminum.

30. The compact oven of claim 26, wherein the at least one parabolic reflector is constructed of aluminum having a randomly embossed surface to scatter the heating energy from the heating surface.

31. The compact oven of claim 27, wherein the at least one parabolic reflector is constructed of aluminum having a randomly embossed surface to scatter the heating energy from the heating surface.

32. The compact oven of claim 1, wherein a removable shield is disposed between the at least one heating element and the cooking cavity, the removable shield being transparent to the energy emitted by the at least one heating element.

33. The compact oven of claim 10, wherein a removable shield is disposed between the at least one heating element and the cooking cavity, the removable shield being transparent to the energy emitted by the at least one heating element.

34. The compact oven of claim 32, wherein the removable shield is constructed of Borosilicate or fused ceramic.

35. The compact oven of claim 33, wherein the removable shield is constructed of Borosilicate or fused ceramic.

36. A method of cooking a food item in a compact oven, comprising the steps of:

placing a food item on a spatula;

inserting the spatula with the food item thereon into an access slot disposed in a housing of the compact oven;

activating a limit switch and a timer in the housing by the insertion of the spatula therein, to energize at least one heating element;

de-energizing the heating element after a per-determined time period has elapsed; and removing the spatula and the cooked food item from the oven.

37. A method of cooking a food item in a compact oven, comprising the steps of:

placing a food item on a spatula;

inserting the spatula with the food item into an access slot disposed in a housing of the compact oven;

activating a limit switch and a timer in the housing by the insertion of the spatula therein, to energize at least one heating element;

energizing an end-of-cooking-time alerting device after a per-determined time period has elapsed; and removing the spatula and the cooked food item from the oven.

* * * * *